United States Patent [19]
Hamrick et al.

[11] 3,982,592
[45] Sept. 28, 1976

[54] INSITU HYDROGENATION OF HYDROCARBONS IN UNDERGROUND FORMATIONS

[75] Inventors: Joseph T. Hamrick, Roanoke; Leslie C. Rose, Rocky Mount, both of Va.

[73] Assignee: World Energy Systems, Fort Worth, Tex.

[22] Filed: Sept. 8, 1975

[21] Appl. No.: 611,138

Related U.S. Application Data

[63] Continuation-in-part of Ser. No. 534,778, Dec. 20, 1974, abandoned.

[52] U.S. Cl. ............................. 166/302; 166/53; 166/59; 166/64; 166/65 R; 166/72; 166/250; 166/303
[51] Int. Cl.² ........................................ E21B 43/24
[58] Field of Search .......... 166/250, 302, 303, 260, 166/261, 57, 59, 53, 63, 64, 65 R, 72, 75

[56] References Cited
UNITED STATES PATENTS

| | | | |
|---|---|---|---|
| 2,506,853 | 5/1950 | Berg et al. | 166/59 |
| 2,734,578 | 2/1956 | Walter | 166/302 UX |
| 2,887,160 | 5/1959 | DePriester et al. | 166/59 |
| 2,890,755 | 6/1959 | Eurenius et al. | 166/59 |
| 3,102,588 | 9/1963 | Fisher | 166/261 |
| 3,208,514 | 9/1965 | Dew et al. | 166/261 |
| 3,327,782 | 6/1967 | Hujsak | 166/261 |
| 3,349,847 | 10/1967 | Smith et al. | 166/259 |
| 3,456,721 | 7/1969 | Smith | 166/59 |
| 3,595,316 | 7/1971 | Myrick | 166/250 X |
| 3,817,332 | 6/1974 | Berry et al. | 166/302 |

*Primary Examiner*—Stephen J. Novosad
*Assistant Examiner*—George A. Suckfield
*Attorney, Agent, or Firm*—Wofford, Felsman, Fails & Zobal

[57] ABSTRACT

A process and system for insitu hydrogenation employing a gas generator in a borehole for burning a hydrogen-rich mixture of hydrogen and oxygen. The gas generator comprises a housing forming a chamber with a combustion zone at one end and a restricted outlet at the other end. A cooling annulus surrounds the chamber with passages leading from the annulus to the chamber. Hydrogen and oxygen are supplied downhole to the generator to form a hydrogen-rich combustible mixture in the combustion zone which is burned whereby hydrogen and steam are injected from the restricted outlet. Hydrogen also is supplied to the cooling annulus. The flow of hydrogen and oxygen to the generator is controlled to maintain the temperature of the exhaust gases at a level sufficient to crack the hydrocarbons in the formations into lighter segments for reaction with the excess hot hydrogen to form lighter and less viscous end products which are recovered from a production well.

6 Claims, 12 Drawing Figures

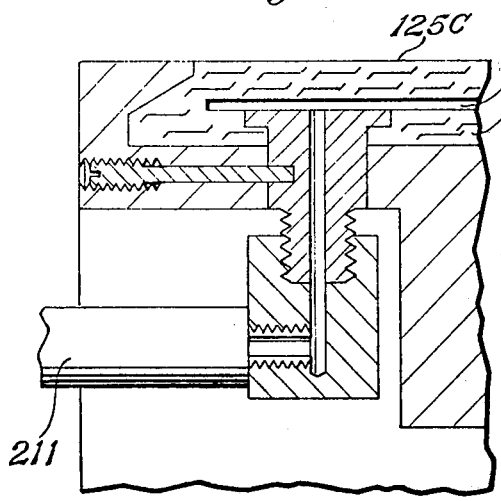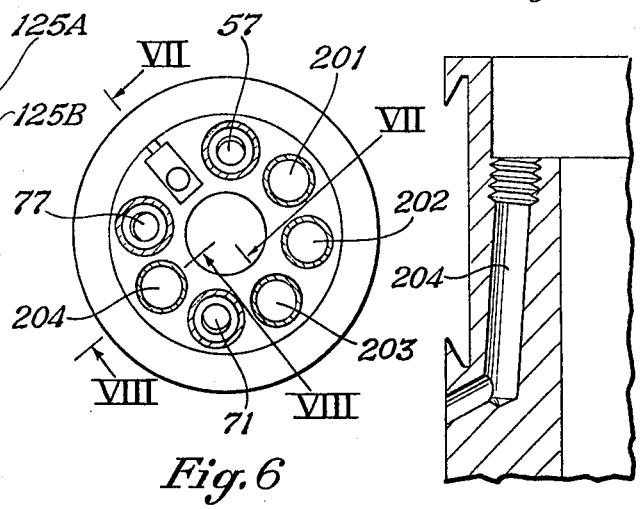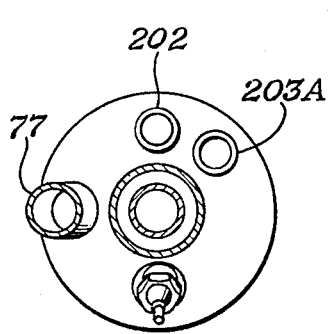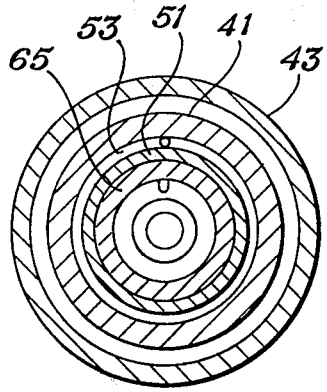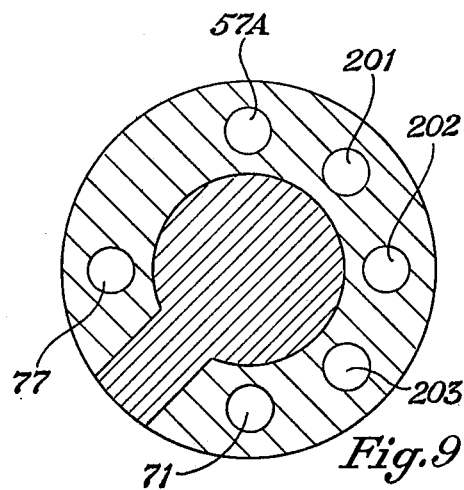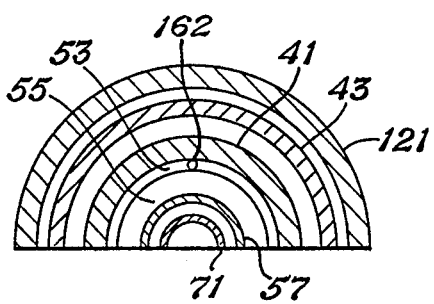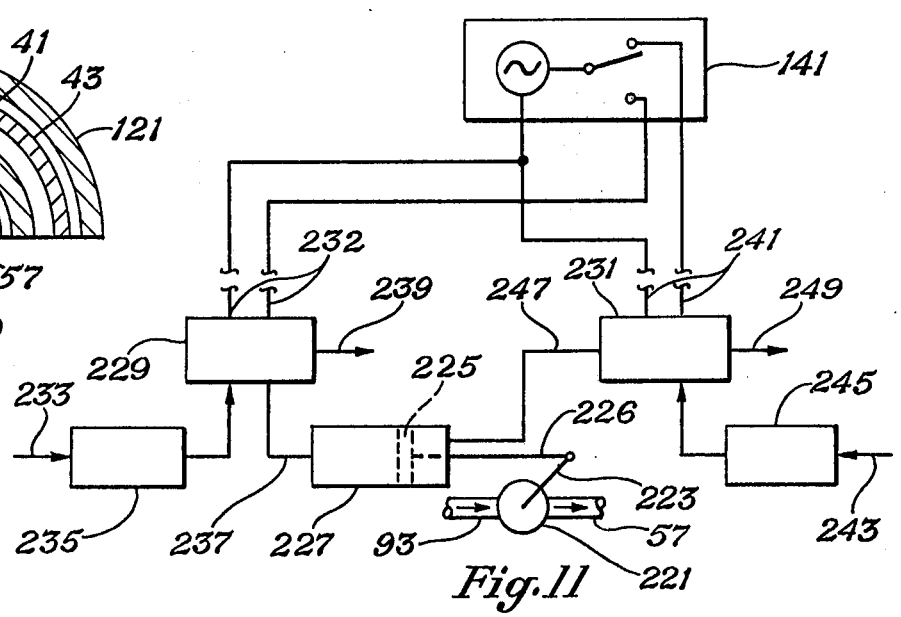

INSITU HYDROGENATION OF HYDROCARBONS IN UNDERGROUND FORMATIONS

This application is a continuation-in-part of U.S. Pat. application, Ser. No. 534,778 filed Dec. 20, 1974, abandoned.

BACKGROUND OF THE INVENTION

This invention relates to a recovery process and system for hydrogenating hydrocarbons in subsurface formations penetrated by a borehole with the use of gas generator located in the borehole.

Due to the viscous qualities of crude oil, its recovery from reservoirs is incomplete. For oil with viscosities below 25 centipoises, approximately 22% of the oil in the reservoirs remains unrecoverable because the oil clings by adhesion and surface tension to the sand or to the other media. With oils in the viscosity range from 25 to 100,000 centipoises or higher, up to 90% is currently unrecoverable (except by heating) due to failure of the oil to flow and because of adhesion and surface tension. Past efforts to recover viscous oils have primarily involved the use of heat from steam or insitu burning of the oil. Even with heating, however, the residue remains approximately at 22%.

SUMMARY OF THE INVENTION

It is an object of the present invention to provide a process and system for recovering hydrocarbons from subsurface formations penetrated by a borehole by insitu hydrogenation employing a gas generator in the borehole for burning a hydrogen-rich mixture of hydrogen and oxygen.

It is a further object of the present invention to employ the gas generator to thermally crack the hydrocarbons into lighter segments for reaction with the excess hot hydrogen to form lighter and less viscous end products and to hydrogenate unsaturated hydrocarbons to upgrade their qualities for end use.

In carrying out the process, a gas generator is located in the borehole at or near the level of the formations of interest. The gas generator comprises a housing forming a chamber and having an upper inlet end for receiving fuel and an oxidizing fluid. The chamber defines a combustion zone. An ignitor is provided for igniting combustible gases in the combustion zone. A restricted lower outlet is provided for the passage of heated gases and an annulus surrounds the chamber and has passages leading to the chamber. In carrying out the process, hydrogen and oxygen are flowed through the borehole from the surface to the gas generator by way of separate passages to form a hydrogen-rich combustible mixture in the combustion zone which is ignited and burned. In the preferred embodiment, a portion of the hydrogen is flowed through the annulus for cooling the gas generator and the exhaust gases and for heating the hydrogen. The flow of hydrogen and oxygen to the gas generator is controlled to maintain the temperature of the gases flowing through the outlet at a level sufficient to cause hydrogenation of the hydrocarbons in the formations. The gas generator may be operated at lower temperatures to cause hydrocracking if suitable catalysts are in the subsurface formations. The cracked gases and liquids move through the formations to a spaced production well for recovery at the surface. In the embodiment disclosed, a portion of the gases recovered are employed to produce hydrogen which is fed back to the gas generator for operation thereof.

BRIEF DESCRIPTION OF THE DRAWINGS

FIG. 4 is a cross-sectional view of FIG. 3B taken through the lines 4—4 thereof;

FIG. 5 is a cross-sectional view of FIG. 3B taken through the lines 5—5 thereof;

FIG. 6 is a cross-sectional view of FIG. 3A taken through the lines 6—6 thereof;

FIG. 7 is a cross-sectional view of FIG. 6 taken through the lines 7—7 thereof;

FIG. 8 is a cross-sectional view of FIG. 6 taken through the lines 8—8 thereof;

FIG. 9 is a cross-sectional view of FIG. 3B taken through the lines 9—9 thereof;

FIG. 10 is a cross-sectional view of FIG. 3B taken through the lines 10—10 thereof;

FIG. 11 illustrates in block diagram, one of the downhole remotely controlled valves of FIGS. 1 and 2.

DETAILED DESCRIPTION OF THE INVENTION

Figure 1:
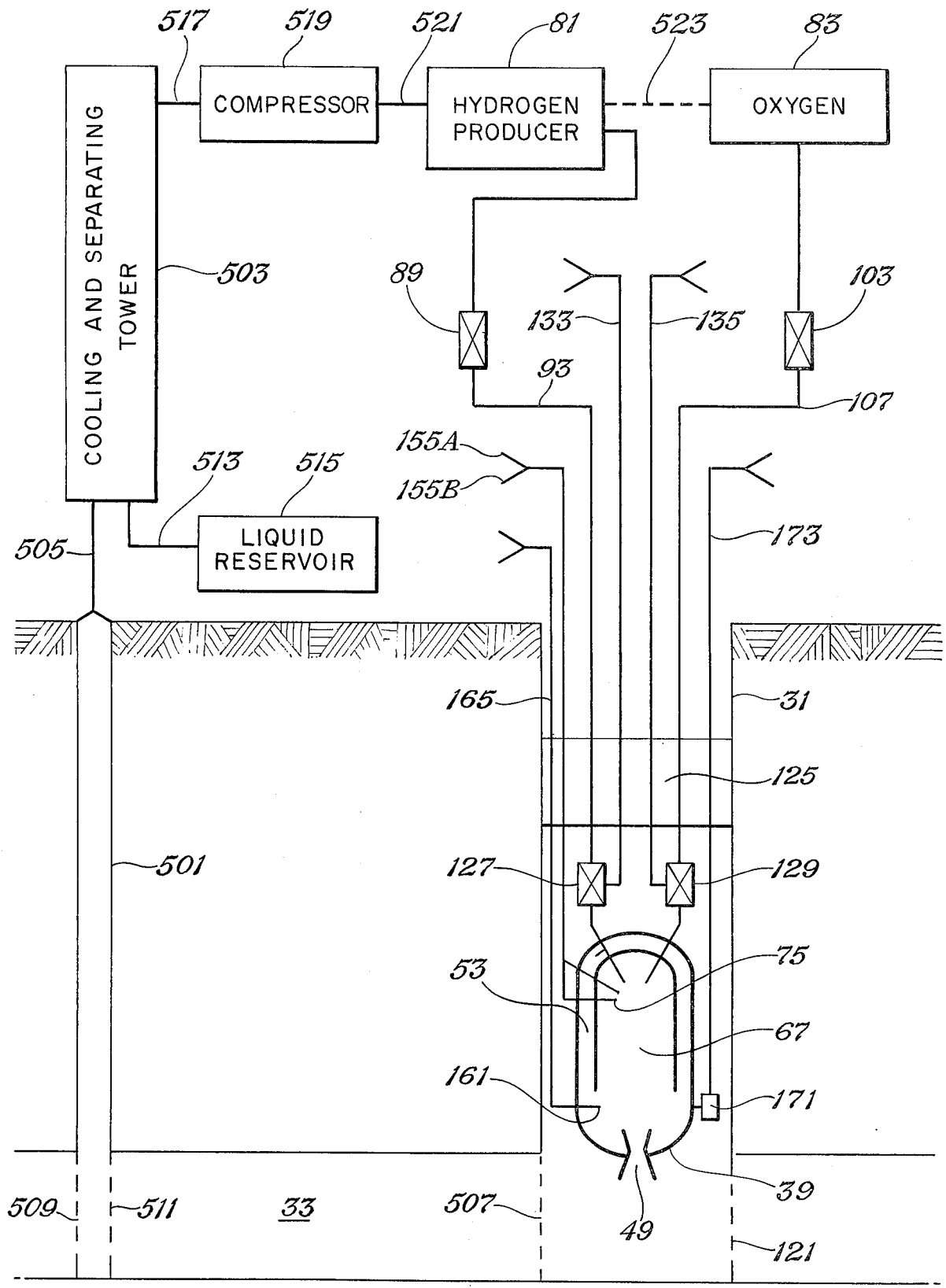
FIG. 1 schematically illustrates a gas generator located in a borehole which penetrates a hydrocarbon bearing formation and a space production well for recovering hydrocarbons from the formations.

Referring now to FIG. 1, there is illustrated a cased injection borehole 31 which penetrates a subsurface oil bearing reservoir 33. Spaced from the borehole 31 is a production borehole 501. Although not shown other spaced production boreholes may be employed. Located in the borehole 31 is a gas generator 39 which is supplied with hydrogen and oxygen from a hydrogen producer 81 and an oxygen supply 83 located at the surface. The borehole casing 121 is sealed above the generator by a packer 125. A cooling and separating tower 503 is located at the surface and is coupled to the production well 501 by way of conduit illustrated at 505.

The gas generator 39 comprises a chamber having a combustion zone 67, a cooling annulus 53 and a restricted outlet 49. Hydrogen from producer 81 is delivered through modulating valve 89 and conduit 93 to the gas generator. Similarly oxygen from supply 83 is delivered through modulating valve 103 and conduit 107 to the gas generator. Hydrogen at the generator is admitted to the combustion zone 67 and cooling annulus 53 by means of solenoid valve 127 which is controlled at the surface by means of leads illustrated at 133. Oxygen is admitted to combustion zone 67 by means of solenoid valve 129 which is controlled at the surface by means of leads illustrated at 135. The amount of hydrogen delivered is sufficient to form a hydrogen-rich mixture in the gas generator which is ignited by applying electric current to leads 155A and 155B to energize glow plug or spark plug 75. Thermocouple 161 senses the temperature near the gas generator exhaust port and transmits temperature data through leads illustrated at 165 to the surface. Similarly pressure transducer 171 transmits data through leads illustrated at 173.

In carrying out the recovery process, hydrogen and oxygen are fed to the gas generator 39 to form a hydrogen-rich combustible mixture which is ignited and burned to generate hot gases which pass through the restricted outlet 49 and enter the well bore 31. From the well bore the gases pass into the bed 33 through perforations 507 formed through the well casing. The hot gases which are composed primarily of steam and hydrogen pass into the reservoir 33.

By means of modulating valves 89 and 103 the temperature of the exhaust gases from the gas generator is regulated to heat the oil in the formations to a temperature sufficient to break the hydrocarbon chains into lighter segments and the segments react with hot hydrogen from the gas generator to form lighter and less viscous end products. For example, the formations may be heated to temperatures of 750°F or greater at a pressure of approximately 2,000 psi. The outputs of thermocouple 161 and transducer 171 are monitored to aid in obtaining the desired temperatures and pressures, it being understood that the temperatures and pressures existing in the formation bed will be less than those measured in the borehole. For so called depleted reservoirs which contain residual oil which occupy 20 to 24% of the pore space in the bed formation, it is necessary to heat the bed above 750°F and possibly as high as approximately 1100°F to adequately crack the oil. The 1,100°F upper limit is desirable to prevent decomposition of methane into carbon and hydrogen and which occurs at about 1,200°F. The process is slightly different from the normal hydrocracking process in that the underground bed may not contain the proper catalytic agents and thermal cracking must occur before hydrogenation. Upon reaction of the hydrogen with the hydrocarbons segments, an amount of heat is released which is equal 5 to 15% of that required to raise the sand bed in the reservoir to 750°F. The manner in which the insitu hydrogenation is programmed is dependent upon the quantity of oil residing in the pore spaces of the formation. Normally the pore space is 38 to 42% of the reservoir volume. Sand, limestone, or shale formations occupy the remainder. If the 42% pore space is fully occupied, the reservoir will contain approximately 3,100 barrels of oil per acre foot. Normally the space is not fully occupied. For reservoirs with high occupancy and using the present method, the temperature is kept just high enough to thermally crack the oil for hydrogenation into liquids primarily. As the occupancy decreases toward 20% it is necessary to increase the temperature to thermally crack and hydrogenate the residual liquid converting it to gases which can escape the pores of the formation.

The resulting hydrogenated products then contain a predominance of lighter ends such as methane, propane, and butane. The following table shows the quantity of heat required for elevating the bed temperature to 750°F for various reservoirs depths.

| Reservoir Depth Ft. | Initial Bed Temperature °F | Btu Input to Bed Per Cubic Ft. of Sand | % Oil Consumed in Heating Bed | | | % Oil Consumed in heating oil in bed |
|---|---|---|---|---|---|---|
| | | | 22% Pore Space Filled 680 bbls/ Acre Ft. | 50% Pore Space Filled 1550 bbls/ Acre Ft. | 100% Pore Space Filled 3100 bbls/ Acre Ft. | |
| — | 70 | 11380 | 26.4 | 11.6 | 5.8 | 2.6 |
| 10,000 | 270 | 8040 | 18.6 | 8.2 | 4.1 | 1.5 |
| 15,000 | 370 | 6370 | 14.7 | 6.5 | 3.2 | 1.0 |
| 20,000 | 470 | 4680 | 10.9 | 4.8 | 2.4 | .4 |

In the above table, the temperatures at various well depths were based on an increase in geothermal temperature of 2°F per 100 foot of depth. The percent of the recovered oil consumed in the process is based upon production of hydrogen from light ends by reforming with a 50% efficiency. Some of the heat from the recovered oil can be used in the reforming process, but it was not considered in the calculation. The heat generated in hydrogenation, taken as 30,000 BTU/BBL, was assigned to heating the oil and subtracted from the oil heating requirements.

For some reservoirs, it may not be necessary to thermally crack the oil, but to apply hydrocracking because of the wide variety of trace elements present in some beds that may act as catalysts for the hydrocracking process. As is well known hydrocracking is the combination of mild thermal cracking and hydrogenation which can be carried out at lower temperatures in the presence of a suitable catalyst. With some catalysts, hydrocracking may proceed at temperatures as low as 500°F and 500 psi. The temperatures, however, may be higher with an upper limit of about 800°F. For a detailed discussion of thermal cracking and hydrogenation and hydrocracking reference is made to the report "Impact of New Technology on the U.S. Petroleum Industry 1946–1965" by the National Petroleum Council, Library of Congress Catalog Card No. 67–31533.

For thin reservoirs, heat escape to the overburden and underburden must be taken into account in supplying heat. This has not been done for the data presented in the table.

If thermal cracking without catalysts followed by hydrogenation is to be employed, initially the gases may be introduced at temperatures in the vicinity of 1,300° to 1,600°F to compensate for rapid heat transfer in the bed. Subsequently the temperatures may be reduced to 900°F to induce initial thermal cracking of the oil in the heated reservoir and as the reservoir reaches minimum thermal cracking temperature the gas generator exhaust may be reduced to 750°F, with dependency upon heat of hydrogenation to raise the temperature in the front moving across the reservoir for cracking purposes.

If the composition of the bed is unknown, the gas generator may be initially operated to produce gases at a lower temperature to determine if lighter hydrocarbons can be recovered from well 501 by hydrocracking. If no recovery is had, the gas generator may be operated at the higher temperature to induce thermal cracking and then hydrogenation. The gas and liquids resulting from hydrogenation whether by thermal cracking without catalysts followed by hydrogenation or by hydrocracking move through perforations 509 formed through the borehole casing 511, and into the borehole 501 to the surface. At the surface the gases and liquids move through conduit 505 to the cooling and separating tower 503. The liquids and gases are separated in the tower and the liquids move through conduit 513 to a reservoir 515. The gases from the top of the tower 503 move through conduit 517 to a compressor 519 which recompresses the gases to 2,500 psi plus whatever pressure drop may be encountered in the system ahead of the well bore chamber 31. From compressor 519, the gases flow to hydrogen producer 81 by way of conduit 521. In some applications, for adequate control, the pressure may have to be increased to 3,800 psi so as to maintain sonic velocity across the generator nozzle or outlet 49. Hydrogen production in hydrogen producer 81 may be by reforming with water or by partial oxidation. If partial oxidation is used, a conduit, shown by broken line 523, is connected from the oxygen source 83 to the hydrogen producer 81. The oxygen source 83 may be a tank which is filled from a commercial supply or from an on site air to oxygen converter. The high pressure required may be from 2,500 to 3,800 psi and may be best achieved by vaporization of liquid oxygen in a closed container.

Figures 3A, 3B:
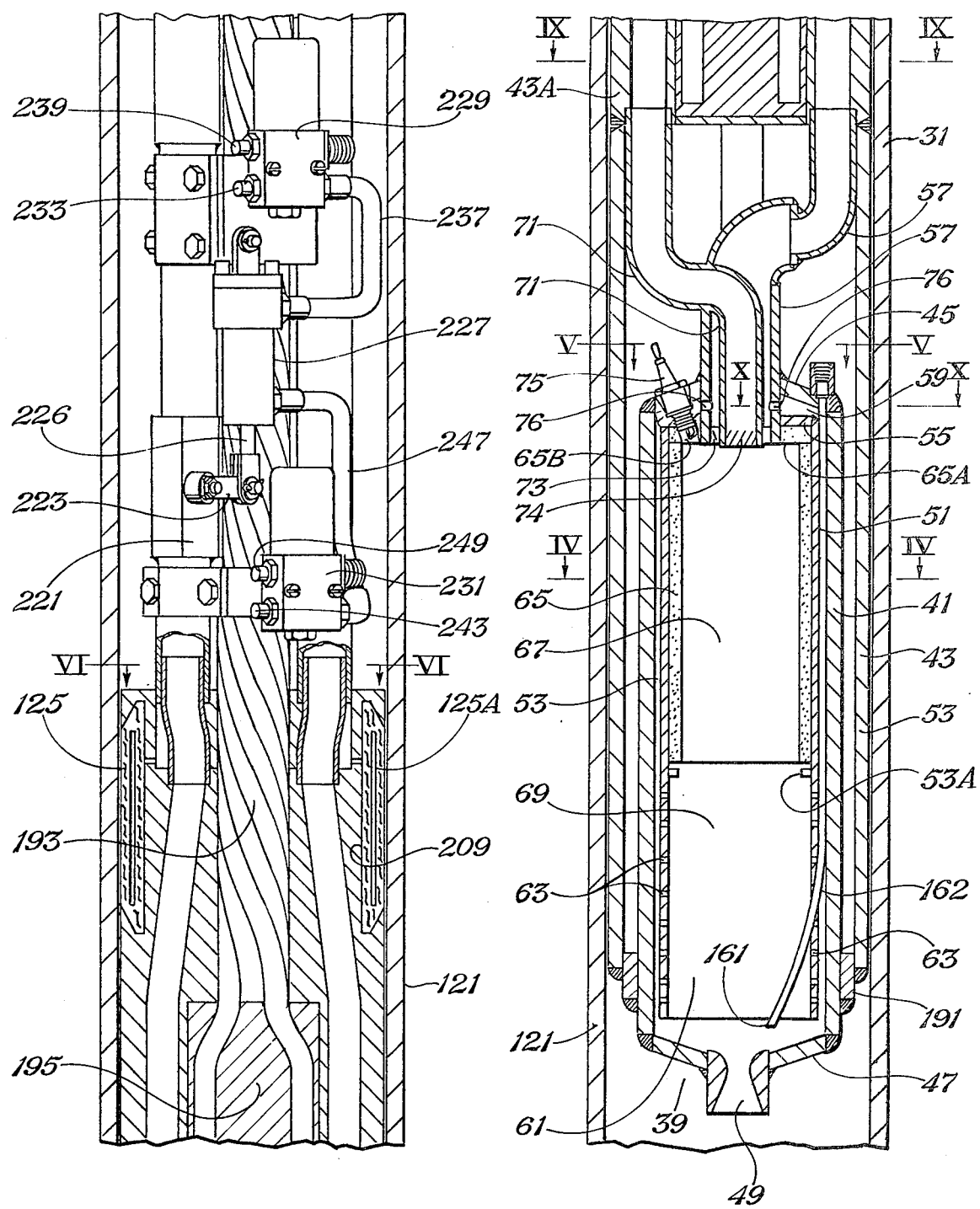
FIG. 3A is an enlarged cross-sectional view of the top portion of the downhole housing structure for supporting the gas generator in a borehole.
FIG. 3B is an enlarged partial cross-sectional view of the lower portion of the housing of FIG. 3A showing the gas generator. The complete housing with the gas generator, may be viewed by connecting the lower portion of FIG. 3A to the top portion of FIG. 3B.

Referring to FIGS. 3A and 3B, the gas generator 39 comprises an outer cylindrical shell 41 supported in a housing 43 located in the borehole. The outer shell 41 has an upper end 45 through which supply conduits and other components extend and a lower end 47 through which a small diameter outlet nozzle 49 extends. Supported within the outer shell 41 is an inner shell 51 which forms the cooling annulus 53 between the inner shell and the outer shell. The inner shell has an upper wall 55 which is connected to a conduit 57 which in turn extends through upper wall 45 and is connected thereto. The conduit 57 forms the fuel supply conduit, as will be described subsequently and also supports the inner shell 51 within the outer shell, forming the annulus 53 and also forming an upper space 59 between the walls 45 and 55. The space 59 is in communication with the annulus 53, as illustrated in FIG. 10. The opposite end of the inner shell 51 is open at 61. Formed through the inner shell at the lower end thereof are a plurality of apertures 63 which provide passages from the annulus 53 to the interior of the inner shell for the flow of cooling fluid. Supported in the inner shell at its upper end is a heat resistant liner 65 which defines a primary combustion zone 67. The liner is supported by a retention ring 53A and has an upper wall portion 65A through which supply conduits and other components extend. The portion of the interior shell at the level of the apertures 63 is defined as a mixing zone 69.

Conduit 57 extends through walls 45 and 55 and through the upper liner wall 65A to the primary combustion zone 67. Concentrically located within the conduit 57 and spaced inward therefrom is a conduit 71 which also extends to the combustion zone 67. Fuel is supplied through the annulus formed between conduits 57 and 71 while an oxidizing fluid is supplied through conduit 71. Swirl vanes 73 and 74 are provided in the annulus between conduit 57 and conduit 71, and in conduit 71 to mix the oxidizer with the fuel to form a combustible mixture which is ignited in the combustion zone by the igniter 75 and burned. As illustrated, the igniter 75 comprises a spark plug or electrode which extends through walls 45 and 55 and into an aperture 65B formed through the upper liner wall 65A whereby it is in fluid communication with the gases in the combustion zone 67.

The oxidizing fluid preferably is oxygen and the fuel is hydrogen. An excess of hydrogen is introduced into the combustion zone of the gas generator to form a hydrogen-rich mixture for reducing the temperature in the primary combustion zone of the gas generator and for providing an excess of hot hydrogen for insitu hydrogenation. Hydrogen can also be supplied to annulus 53 through perforations 76 formed in conduit 57 to provide communication with the space 59 formed between the walls 45 and 55. From the space 59 the hydrogen flows into annulus 53. The hydrogen flowing through annulus 53 cools the inner shell 51 and flows through apertures 63 to cool the combustion gases to the desired temperature. As the hydrogen flowing through annulus 53 and into the mixing zone 69 performs its cooling function it is heated to provide an additional supply of hot hydrogen for hydrogenation. The steam derived from the combustion of the hydrogen and oxygen and the excess hot hydrogen then flow through the outlet nozzle 49 into the formations. Since the exhaust nozzle 49 is small compared with the diameter of the combustion zone, the behavior of gases generated in the gas generator is not affected by the external pressure (pressure of the oil reservoir) until the external pressure approaches the critical pressure of approximately 57% of the value of the internal pressure. Therefore, for a set gas generator pressure, there is no need to vary the flow rate of the ingredients into the generator until the external pressure (oil reservoir pressure) approaches approximately 57% of the internal gas pressure. The behavior of gases in the generator is not significantly affected until the external pressure reaches 80% of internal.

Figure 2:
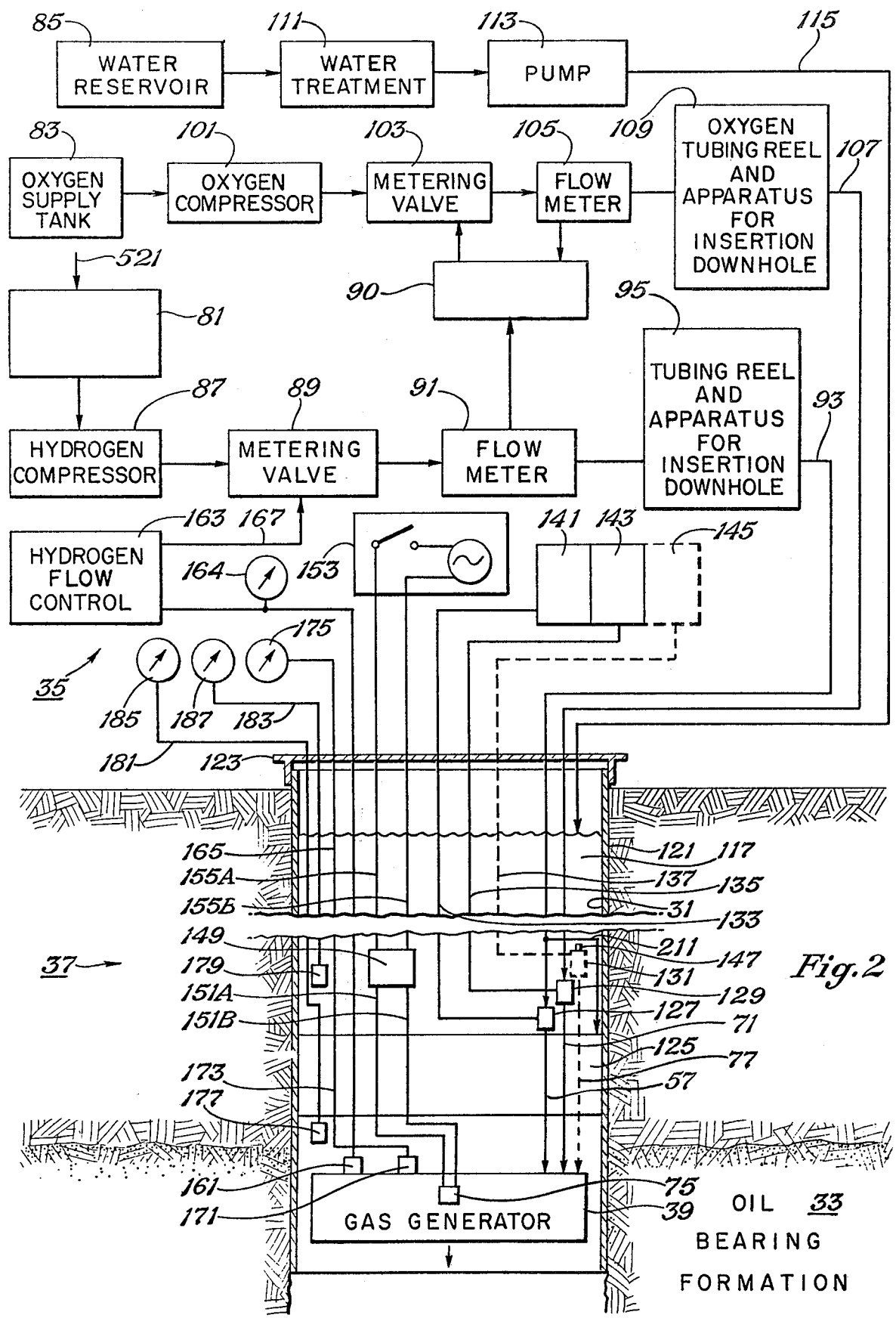
FIG. 2 illustrates more detail of the uphole and downhole system for operating the gas generator in the borehole.

Referring to FIG. 2, the hydrogen and oxygen are supplied to the generator located downhole by way of the hydrogen supply or producer 81, and oxygen supply 83 as indicated above. Hydrogen is supplied by way of a compressor 87 and then through the metering or modulating valve 89, a flow meter 91, and through conduit 93 which is inserted downhole by a tubing reel and apparatus 95. Oxygen is supplied downhole by way of a compressor 101, and then through the metering or modulating valve 103, a flow meter 105, and through conduit 107 which is inserted downhole by way of a tubing reel and apparatus 109. Water can be used in addition to hydrogen for cooling the generator, and it can be provided from an uphole water reservoir 85. From the water reservoir 85, the water is supplied to a water treatment system 111 and then pumped by pump 113 through conduit 115 into the borehole 31. In FIG. 2, water in the borehole is identified at 117.

The borehole 31 is cased with steel casing 121 and has an upper well head 123 through which all of the conduits, leads, and cables extend. Located in the borehole above and near the gas generator is a packer 125 through which the conduits, cables, and leads extend. The flow of hydrogen and oxygen to the generator is controlled by solenoid actuated valves 127 and 129 which are located downhole near the gas generator above the packer. Valves 127 and 129 have leads 133 and 135 which extend to the surface to solenoid controls 141 and 143 for separately controlling the opening and closing of the downhole valves from the surface. The controls 141 and 143 in effect, are switches which may be separately actuated to control the application of electrical energy to the downhole coils of the valves 127 and 129. Valve 127 is coupled to hydrogen conduits 93 and 57 while valve 129 is coupled to oxygen conduits 107 and 71.

The igniter 75 is coupled to a downhole transformer 149 by way of leads 151A and 151B. The transformer is coupled to an uphole ignition control 153 by way of leads 155A and 155B. The uphole ignition control 153 comprises a switch for controlling the application of electrical energy to the downhole transformer 149 and hence to the igniter 75. The thermocouple 161 is supported by the gas generator and is electrically coupled to an uphole hydrogen flow control 163 by way of leads illustrated at 165. The hydrogen flow control senses the temperature detected by the thermocouple and produces an output which is applied to the metering valve 89 for controlling the flow of hydrogen to obtain the desired hydrogen-oxygen ratio. The output from the flow control 163 may be an electrical output or a pneumatic or hydraulic output and is applied to the valve 89 by way of a lead or conduit illustrated at 167.

Also supported by the gas generator is the pressure transducer 171 which in FIG. 2 is shown located in the space between the gas generator and packer for sensing the pressure in the generator. Leads illustrated at 173 extend from the transducer 171 to the surface where they are coupled to a meter 175, for monitoring purposes. Also provided below and above the packer are pressure transducers 177 and 179 which have leads 181 and 183 extending to the surface to meters 185 and 187 for monitoring the pressure differential across the packer.

Referring again to FIGS. 3A and 3B, the gas generator 39 is secured to the housing 43 by way of an annular member 191. The housing in turn is supported in the borehole by a cable 193. As illustrated, cable 193 has its lower end secured to a zinc lock 195 which is secured in the upper portion 43A of the housing. As illustrated in FIGS. 5, 6, and 9, the upper portion of the housing has conduits 57, 201–203, 71 and 204 extending therethrough for the hydrogen, igniter wires, thermocouple wires, pressure lines, oxygen, and a dump conduit, the latter of which will be described subsequently. The upper portion of the housing also has an annular slot 209 formed in its periphery in which is supported the packer 125. The packer is an elastic member that may be expanded by the injection of gas into an inner annulus 125A formed between the inner and outer portions 125B and 125C of the packer. (See also FIG. 7.) In the present embodiment, hydrogen from the hydrogen conduit is employed to inflate the packer to form a seal between the housing 43A and the casing 121 of the borehole. Hydrogen is preferred over oxygen since it is non-oxidizing and hence will not adversely affect the packer. Hydrogen from the hydrogen conduit 57 is injected into the annulus 125A by way of a conduit 211 which is coupled to the hydrogen conduit 93 above the downhole valve 127. See FIGS. 2 and 7.

With the downhole system in place in the borehole, as illustrated in FIG. 2, and all downhole valves closed, the start-up sequence is as follows. Hydrogen and oxygen are admitted to the downhole piping and brought up to pressure by opening metering valves 89 and 103. The hydrogen inflates the packer 125 and forms a seal between the housing 43A and the borehole casing 121, upon being admitted to the downhole pipe 93. Water, may then be admitted to the well casing and the casing filled or partially filled. This is accomplished by actuating pump 113. Water further pressurizes the downhole packer seal. The ignition control 153 and the oxygen and hydrogen solenoid valves 127 and 129 are set to actuate, in the proper sequence, as follows. The igniter is started by actuating control 153; the oxygen valve 129 is opened by actuating control 143 to give a slight oxygen lead; the hydrogen valve 127 is then opened by actuating control 141. This sequence may be carried out by manually controlling controls 141, 143 and 153 or by automatically controlling these controls by an automatic uphole control system. At this point, a characteristic signal from the downhole pressure transducer 171 will show on meter 175 whether or not a normal start was obtained and the thermocouple will show by meter 164, connected to leads 165, whether or not the desired temperature is being maintained. The hydrogen flow controller 163 is slaved to thermocouple 161 which automatically controls the hydrogen flow. The hydrogen to oxygen ratio may be controlled by physically coupling the hydrogen and oxygen valves, electrically coupling the valves with a self synchronizing motor or by feeding the output from flow meters 105 and 91 into a comparator 90 which will provide an electrical output for moving the oxygen metering valve in a direction that will keep the desired hydrogen-oxygen ratio. The comparator may be in the form of a computer which takes the digital count from each flow meter, computes the required movement of oxygen metering valve and feeds the required electrical, pneumatic, or hydraulic power to the valve controller to accomplish it. Such controls are available commercially. The flow rate through the metering valve 89 is controlled by electrical communication through conduit 167 from the hydrogen flow controller 163. Communication from the hydrogen flow controller 163 to metering valve 89 optionally may be by pneumatic or hydraulic means through an appropriate conduit. At this point, the flow quantities of hydrogen and oxygen are checked to ascertain proper ratios of hydrogen and oxygen. Monitoring of the flow of hydrogen and oxygen is carried out by observing flow meters 91 and 105. The flow rate meters or sensors 91 and 105 in the hydrogen and oxygen supply lines at the surface also may be employed to detect pressure changes in the gas generator. For example, if the gas generator should flame out, the flow rates of fuel and oxidizer will increase, giving an indication of malfunction. If the reservoir pressure should equal the internal gas generator pressure, the flow rates of the fuel and oxidizer would drop, signaling a need for a pressure increase from the supply. Adjustment of the flow quantities of hydrogen and oxygen can be made by adjusting the supply pressure. Both valves 89 and 103 may be adjusted manually to the desired initial set value.

At this point, the gas generator is on stream. As the pressure below the packer builds up, there may be a tendency for the packer to be pushed upward and hot gases to leak upward into the well casing both of which are undesirable and potentially damaging. This is prevented, however, by the column of water maintained in the casing and which is maintained at a pressure that will equal or exceed the pressure of the revervoir below the packer. For shallow wells, it may be necessary to maintain pressure by pump 113 in addition to that exerted by the water column. For the deep wells, it may be necessary to control the height of the water column in the casing. This may be accomplished by inserting the wate conduit 115 in the borehole to an intermediate depth with a float operated shut off valve; by measuring the pressures above and below the packer; by measuring the pressure differential across the packer; or by measuring the change in tension on the cable that supports the packer and gas generator as water is added in the column. Flow of water into the casing 121 will be sut off if the measurement obtained becomes too great. Water cut-off would be automatic. In addition, a water actuated switch in the well may be employed to terminate flow after the well is filled to a desired height. The pressure and pressure differential can be sensed by commercially available pressure transducers, such as strain gages, variable reluctance elements or piezoelectric elements, which generate an electrical signal with pressure change. Changes in the cable tension can be sensed by a load cell supporting the cable at the surface. In the embodiment of FIG. 1, pressure above and below the packer is measured by pressure transducers 177 and 179, their outputs of which are monitored by meters 185 and 187 for controlling flow of water into the casing 121. On stream operation of the gas generator may extend over periods of several weeks.

In shut down operations, the following sequence is followed. The downhole oxygen valve 129 is shut off first, followed by shut off of the hydrogen valve 127. Shut off of the igniter is accomplished manually or by timer after start-up is achieved.

It is necessary for start-up and operation of the gas generator to locate the valves downhole just above the packer to assure an oxygen lead at start-up and positive responses to control. Use of the downhole remotely controlled valves 127 and 129 has advantages in that they provide positive control at the gas generator for the flow of fluids to the generator. The downhole valves 127 and 129 may be cylinder actuated ball type valves which may be operated pneumatically or hydraulically (hydraulically in the embodiment of FIG. 1), using solenoid valves to admit pressure to the actuating cylinder. When water is employed in the borehole, it will be necessary to exhaust one port of the solenoid valves below the downhole packer. Further, for more positive actuation, it may be desirable to use unregulated water pressure as the actuating fluid, as it will provide the greatest pressure differential across the packer. A schematic diagram of the valve arragement for each of the valves 127 and 129 as illustrated in FIG. 11. In this figure, the valve 127 is identified as valve 221. The valve 129 will be connected in a similar manner. As illustrated, the valve shown in FIG. 11 comprises a ball valve 221 for controlling the flow of fluid through conduit 57. The opening and closing of the ball valve is controlled by a lever 223 which in turn is controlled by a piston 225 and rod 226 of a valve actuating cylinder 227. Two three-way solenoid valves 229 and 231 are employed for actuating the cylinder 227 to open and close the ball valve 221. As illustrated, the three-way solenoid valve 229 has electrical leads 232 extending to the surface and which form a part of leads 133. It has a water inlet conduit 233 with a filter and screen 235; an outlet conduit 237 coupled to one side of the cylinder 227; and an exhaust port 239. Similarly, the valve 231 has electrical leads 241 extending to the surface and which also form a part of leads 133. Valve 231 has a water inlet conduit 243 with a filter and screen 245 coupled therein; an outlet conduit 247 coupled to the other side of the cylinder 227; and an exhaust port 249. Both of ports 239 and 249 are connected to the dump cavity 204 with extends through the upper housing portion 43A from a position above the packer to a position below the packer. Hence, both ports 239 and 249 are vented to the pressure below the packer 125. In operation, valve 229 is energized and valve 231 de-energized to open ball valve 221. In order to close ball valve 221, valve 229 is de-energized and valve 231 energized. When solenoid valve 229 is energized and hence opened, water pressure is applied to one side of the cylinder 227 by way of conduit 233, valve 229, and conduit 237 to move its piston 225 and hence lever 223 to a position to open the ball valve 221 to allow fluid flow through conduit 57. When valve 231 is deenergized and hence closed, the opposite side of the cylinder 227 is vented to the pressure below the packer by way of conduit 247, valve 231 and conduit 249. When valve 231 is opened, water pressure is applied to the other side of the cylinder by way of conduit 243, valve 231 and conduit 247 to move the actuating lever 223 in a direction to close the valve 221. When valve 229 is closed, the opposite side of the cylinder is vented to the pressure below the packer by way of conduit 237, valve 229, and conduit 239.

Referring again to the packer 125, initial sealing is effected by pneumatic pressure on the seal from the hydrogen pressure and finally from pressure exerted by the water column. Thus, the packer uses pneumatic pressure to insure an initial seal so that the water pressure will build up on the top side of the seal. Once the water column in the casing reaches a height adequate to hold the seal out against the casing, the pneumatic pressure is no longer needed and the hydraulic pressure holding the seal against the casing increases with the water column height. Hence, with water exerting pressure on the pneumatic seal in addition to the sealing pressure from the hydrogen, there will be little or no leakage past the packer. More important, however, is the fact that no hot gases will be leaking upward across the packer since the down side is exposed to the lesser of two opposing pressures. In addition to maintaining a positive pressure gradient across the packer, the water also acts as a coolant for the packer seal and components above the packer. The seal may be made of viton rubber or neoprene. The cable suspension system acts to support the gas generator and packer from the water column load. In one embodiment, the cable may be made of plow steel rope.

In one embodiment the downhole generator may be employed in a borehole casing having an inside diameter of 6.625 inches. The outer shell 41 (FIG. 3B) and the inner shell 51 of the gas generator may be formed of 304 stainless steel. The wall of the outer shell 41 may be three-eighths of an inch thick while the wall of the inner shell 51 may be one-eighth of an inch thick. The liner 65 may be formed of grahite with a wall thickness of five-sixteenths of an inch. It extends along the upper 55% of the inner shell. As the inner shell 51 is kept cool by the hydrogen it will not expand greatly. The graphite also will be cooled on the outer surface and therefore will not reach maximum temperature. The guide vanes 74 in the oxygen tube 71 swirl the incoming oxygen in one direction and guide vanes 73 in the hydrogen annulus between tubes 71 and 57 swirl the hydrogen in a direction opposite that of the oxygen. The oxygen, being heavier than the hydrogen, is centrifuged outward, mixing with the hydrogen. A spark is provided for igniting the hydrogen by means of the electrode 75, as mentioned above. The thermocouple 161 is housed in a sheath of tubing 162 running from the top of the generator to a point near the exhaust nozzle 49 and senses the temperature at that point. This temperature measurement is used to control the fuel-oxidizer flow to the gas generator to maintain a desired exhaust temperature. The leads of the thermocouple extend through conduit 202 of the housing (FIG. 9) and at 165 (FIG. 2) to the surface. The pressure transducer 171 (FIG. 2) allows monitoring of the generator pressure. It is located in the space between the generator and packer and is connected to the generator at 203A (FIG. 5). The transducer 171 has leads 173 extending through conduit 203 of the housing to the surface. The area of the exhaust nozzle for a nozzle coefficient of 100% is 0.332 inches square. For a nozzle coefficient of 0.96, the area is 0.346 inches square for a diameter of 0.664 of an inch. The inside diameter of the outer shell 41 may be 4.3 inches, and the inside diameter of the inner shell 3.65 inches. For these dimensions, the nozzle 49 may have a minimum inside diameter of 0.664 of an inch. The flow quantity from the gas generator is not affected by oil reservoir pressure until the reservoir reaches the critical pressure ratio of approximately 0.57. It is not greatly affected until reservoir pressure ratio reaches 0.800, after which flow rate drops off rapidly. With the high pressures that are associated with a gas generator, a plug can be inserted in the nozzle 49 before the generator is lowered into the borehole, so that it can be blown out up-on start-up of the gas generator. The plug will be employed to prevent borehole liquid from entering the generator when it is lowered in place in the borehole. Further, because of the continued availability of high pressure and small area required, a check valve downstream of the nozzle can be provided so that upon shut down of the gas generator, the check valve will close, keeping out any fluids which could otherwise flow back into the generator.

Although not shown, it is to be understood that suitable cable reeling and insertion apparatus will be employed for lowering the gas generator into the borehole by way of cable 193. In addition, if the water conduit 115 is to be inserted into the borehole to significant depths, suitable water tubing reel and apparatus similar to that identified at 95 an 109 will be employed for inserting the water tubing downhole.

The hydrogen and oxygen metering valves 89 and 103 will have controls for manually presetting the valve openings for a given hydrogen-oxygen ratio. Valve 103 is slaved to vale 89, as indicated above. The valve openings may be changed automatically for changing the flow rates therethrough by the use of hydraulic or pneumatic pressure or by the use of electrical energy. If the metering valves are of the type which are actuated by hydraulic or pneumatic pressure, they may include a spring loaded piston controlled by the hydraulic or pneumatic pressure for moving the needle in or out of an orifice. If the metering valves are of the type which are actuated electrically, they may include an electric motor for controlling the opening therethrough. Suitable metering valves 89 and 103 may be purchased commercially from companies such as Allied Control Co., Inc. of New York, N.Y., Republic Mfg. Co. of Cleveland, Oh., Skinner Uniflow Valve Div. of Cranford, N.J., etc. In the alternative, valves 89 and 103 may be controlled manually if desired.

In the embodiment of FIG. 2, valve 89 is actuated automatically by thermocouple signal. The downhole thermocouple 161 produces an electrical signal representative of temperature and which is applied to the hydrogen flow control 163. If the metering valve 89 is electrically activated, the hydrogen flow control produces an appropriate electrical output, in response to the thermocouple signal, and which is applied to the valve by way of leads 167 for reducing or increasing the flow rate therethrough. If the valve 89 is hydraulically or pneumatically actuated, the hydrogen flow control 163 will convert the thermocouple signal to hydraulic or pneumatic pressure for application to the valve 89 for control purposes. In the alternative valves 89 and 103 may be controlled manually if desired.

The flow meters 91 and 105 may be of the type having rotatable vanes driven by the flow of fluid therethrough. The flow rate may be determined by measuring the speed of the vanes by the use of a magnetic pickup which detects the vanes upon rotation past the pickup. The output count of the magnetic pickup is applied to an electronic counter for producing an output repesentative of flow rate.

As indicated above, an excess of hydrogen (hydrogen-rich) is introduced into the combustion zone of the gas generator for reducing the temperature in the primary combustion zone of the gas generator and to provide an excess of hot hydrogen for hydrogenation of the oil to form less viscous hydrocarbons. The maximum temperature produced by burning hydrogen stoichiometrically with oxygen is about 5000°F or slightly higher at atmospheric pressure. By employing a hydrogen-rich mixture the temperature in the primary combustion zone may be reduced to as low as 1800°F without causing flame-out. Reduction of the temperature in the primary combustion zone with a hydrogen-rich mixture has advantages in that it allows the gas generator to be fabricated out of more conventional materials. In this respect, a low melting point material such as aluminum oxide or silicon dioxide refractory material or even plain stainless steel may be employed as the liner instead of graphite. In order to reduce the temperature in the primary combustion zone to the desired level the flow rate of hydrogen may be four to six times the hydrogen flow rate required for stoichiometric burning. Other flow rates may be employed dependant upon the amount of temperature reduction desired.

As also indicated above, hydrogen is flowed through the annulus 53 for cooling the gas generator; for reducing the temperature of the exhaust gases further to the desired level below 1800°F; and for providing additional hot hydrogen for hydrogenation.

In the preferred embodient hydrogen is flowed through the annulus 53 for the purposes as stated above. In some instances it may be desirable to flow water through the annulus 53 for cooling purposes instead of hydrogen, although the amount of hydrogen otherwise provided for hydrogenation will be reduced. Water may be flowed through the annulus 53 by providing a solenoid actuated valve 131 and coupling the upper end of a conduit 77 to the valve 131. See FIGS. 2, 5, 6 and 9. Valve 131 will be constructed in the same manner as valves 127 and 129. The lower end of the conduit 77 extends through the upper wall 45 of the outer shell 41 in communication with the space 59 and hence in communication with the annulus 53. In this embodiment the perforations or apertures 76 in conduit 57 will be plugged. Valve 131 has an inlet 147 for allowing the water in the borehole casing to flow to the gas generator annulus 53 by way of conduit 77 and space 59 when the valve 131 is opened. Valve 131 has leads 137 which extend to the surface to solenoid control 145 for controlling the opening and closing of valve 131 from the surface. Control 147 comprises a switch which may be actuated to control the application of electrical energy to the downhole coil of valve 131. In the start-up operation of the gas generator valve 131 is opened after the oxygen and hydrogen valves 129 and 127 are opened. The water will flow into the annulus 53 and through the apertures 63 into the mixing zone 69 for cooling the gas generator and for reducing the temperature of the exhaust gases. In shut down operations of the gas generator, valve 131 is closed after the oxygen and hydrogen valves 129 and 127 are closed. In FIG. 2, components 77, 131, 147, 137 and 145 are shown in dotted form to indicate that they are alternative components. Conduit 77 also is shown in FIGS. 5, 6 and 9. In the preferred embodiment wherein hydrogen is flowed from conduit 57 through apertures 76 into the annulus 53 of the gas generator, conduit 77 will not be employed and its entrance to space 59 through wall 45 will be plugged.

Instead of solenoid actuated valves 127 and 129 and 131 a spool shaped valve arrangement may be provided to perform the functions of these valves as disclosed in our copending U.S. Pat. application, Ser. No. 534,778.

Although the preferred embodiment is directed to a recovery process and system for insitu hydrogenation of oil in subsurface formations employing the gas generator, it is to be understood that the recovery process and system of the present invention may be employed for insitu hydrogenation of coal or oil shale employing the gas generator in a borehole traversing the coal or oil shale beds. When applied to shale, the shale will be fractured before the process is carried out.

Although not shown, well known pumping equipment for the production well 501 may be used if necessary. In some cases it may be possible to use air instead of oxygen for the oxidizer.

We claim:

1. A process of hydrogenating hydrocarbons in underground formations penetrated by a borehole and wherein a gas generator is located in the borehole at or near the level of said formations, said gas generator comprising:
    a housing forming a chamber and having an upper inlet end for receiving fuel and an oxidizing fluid,
    said chamber defining a combustion zone,
    an igniter for igniting combustible gases in said combustion zone,
    a restricted lower outlet for the passage of heated gases, and
    an annulus surrounding said chamber and having passages leading to said chamber,
    said process comprising the steps of:
        flowing through said borehole from the surface to said gas generator, by way of separate passages, hydrogen and oxygen to form a hydrogen-rich combustible mixture in said combustion zone,
        igniting and burning the combustible mixture in said combustion zone, and
        controlling the flow of hydrogen and oxygen to said gas generator to maintain the temperature of the gases and fluids flowing through said outlet at a level sufficient to cause hydrogenation of the hydrocarbons in said formations.

2. A process of hydrogenating hydrocarbons in underground formations penetrated by a borehole and wherein a gas generator is located in the borehole at or near the level of said formations, said gas generator comprising:
    a housing forming a chamber and having an upper inlet end for receiving fuel and an oxidizing fluid,
    said chamber defining a combustion zone,
    an igniter for igniting combustible gases in said combustion zone,
    a restricted lower outlet for the passage of heated gases, and
    an annulus surrounding said chamber and having passages leading to said chamber,
    said process comprising the steps of:
        flowing through said borehole from the surface to said gas generator, by way of separate passages, hydrogen and oxygen to form a hydrogen-rich combustible mixture in said combustion zone,
        igniting and burning the combustible mixture in said combustion zone,
        flowing a portion of the hydrogen through said annulus for cooling said gas generator and gases of combustion and for heating the hydrogen, and
        controlling the flow of hydrogen and oxygen to said gas generator to maintain the temperature of the gases and fluids flowing through said outlet at a level sufficient to cause hydrogenation of the hydrocarbons in said formations.

3. The process of claim 2 wherein the temperature of the gases flowing through said outlet is maintained at a level not higher than about 1100°F.

4. A process of recovering hydrocarbons or other materials from underground formations penetrated by a first borehole and a spaced production borehole and wherein a hydrogen producer and a source of oxygen are located at the surface and a gas generator is located in said first borehole at or near the level of said formations,
    said gas generator comprising:
        a housing forming a chamber and having an upper inlet end for receiving fuel and an oxidizing fluid,
        said chamber defining a combustion zone,
        an igniter for igniting combustible gases in said combustion zone,
        a restricted lower outlet for the passage of heated gases, and
        a cooling fluid annulus surrounding said chamber and having passages leading to said chamber,
    said process comprising the steps of:
        flowing through said borehole from said hydrogen producer and from said source of oxygen, by way of separate passages, hydrogen and oxygen to form a hydrogen-rich combustible mixture in said combustion zone,
        igniting and burning the combustible mixture in said combustion zone,
        flowing a portion of the hydrogen through said cooling annulus for cooling said gas generator and gases of combustion and for heating the hydrogen,
        controlling the flow of hydrogen and oxygen to said gas generator to maintain the temperature of the gases and fluids flowing through said outlet at a level sufficient to cause hydrogenation of the hydrocarbons in said formations,
        recovering hydrocarbons from said production boreholes, and
        applying at least a portion of said hydrocarbons recovered, to said hydrogen producer for producing hydrogen for supplying hydrogen to said gas generator.

5. A system for recovering hydrocarbons or other materials from underground formations penetrated by a first borehole and a spaced production borehole comprising:
a hydrogen producer and a source of oxygen are located at the surface,
a gas generator is located in said first borehole at or near the level of said formations,
said gas generator comprising:
a housing forming a chamber and having an upper inlet end for receiving fuel and an oxidizing fluid, said chamber defining a combustion zone,
an igniter for igniting combustible gases in said combustion zone,
a restricted lower outlet for the passage of heated gases, and
a cooling fluid annulus surrounding said chamber and having passages leading to said chamber,
means for flowing through said borehole from said hydrogen producer and from said source of oxygen,
by way of separate passages, hydrogen and oxygen to form a hydrogen-rich combustible mixture in said combustion zone,
means for igniting and burning the combustible mixture in said combustion zone,
means for flowing a portion of the hydrogen through said cooling annulus for cooling said gas generator and gases of combustion for heating the hydrogen.
means for controlling the flow of hydrogen and oxygen to said gas generator to maintain the temperature of the gases and fluids flowing through said outlet at a level sufficient to cause hydrogenation of the hydrocarbons in said formations,
means for recovering hydrocarbons from said production borehole, and
means for applying at least a portion of said hydrocarbons recovered, to said hydrogen producer for producing hydrogen for supplying hydrogen to said gas generator.

6. A system for use for hydrogenating hydrocarbons in underground formations penetrated by a borehole, comprising:
a gas generator located in the borehole at or near the level of said formations,
said gas generator comprising:
a housing forming a chamber and having an upper inlet end for receiving fuel and an oxidizing fluid, said chamber defining a combustion zone,
an igniter for igniting combustible gases in said combustion zone,
a restricted lower outlet for passage of heated gases, and
a cooling fluid annulus surrounding said chamber and having passages leading to said chamber,
a source of hydrogen located at the surface,
hydrogen conduit means coupled to said source of hydrogen and extending from the surface to said gas generator for supplying hydrogen from the surface to said inlet end of said gas generator located in said borehole,
a source of oxygen located at the surface,
oxygen conduit means coupled to said source of oxygen and extending from the surface to said gas generator for supplying oxygen from the surface to said inlet end of said gas generator located in said borehole,
means coupled to said gas generator for diverting a portion of said hydrogen from said hydrogen conduit means into said annulus for cooling said gas generator and gases of combustion and for providing hot hydrogen, and
means for controlling the flow of hydrogen and oxygen to said gas generator to form a hydrogen-rich combustible mixture in said combustion zone and to maintain the temperature of the gases and fluids flowing through said outlet at a level sufficient to cause hydrogenation of the hydrocarbons in said formations.

* * * * *

UNITED STATES PATENT OFFICE
CERTIFICATE OF CORRECTION

Patent No. 3,982,592      Dated September 23, 1976

Inventor(s) Joseph T. Hamrick et al.

It is certified that error appears in the above-identified patent and that said Letters Patent are hereby corrected as shown below:

On the cover sheet title of invention should read -- INSITU HYDROGENATION OF HYDROCARBONS IN UNDERGROUND FORMATIONS --.

Column 3, line 23, "preforations" to -- perforations --.

Column 3, line 30, "react" to -- reacted --.

Column 14, line 66, "boreholes" to -- borehole --.

Column 15, line 32, after "combustion" and before "for" add -- and --.

Signed and Sealed this

Fifteenth Day of November 1977

[SEAL]

Attest:

RUTH C. MASON       LUTRELLE F. PARKER
Attesting Officer      Acting Commissioner of Patents and Trademarks